Patented Feb. 22, 1949

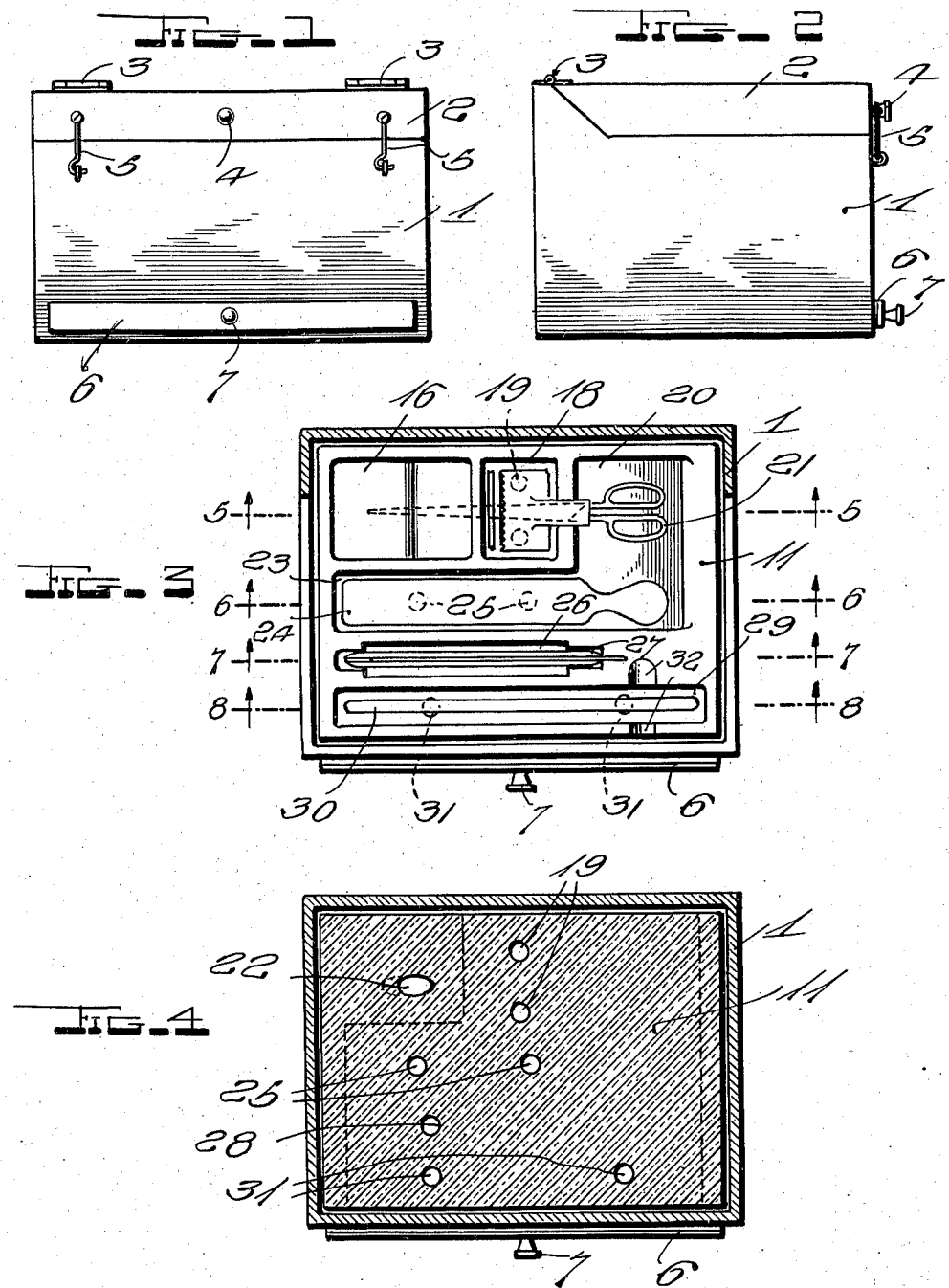

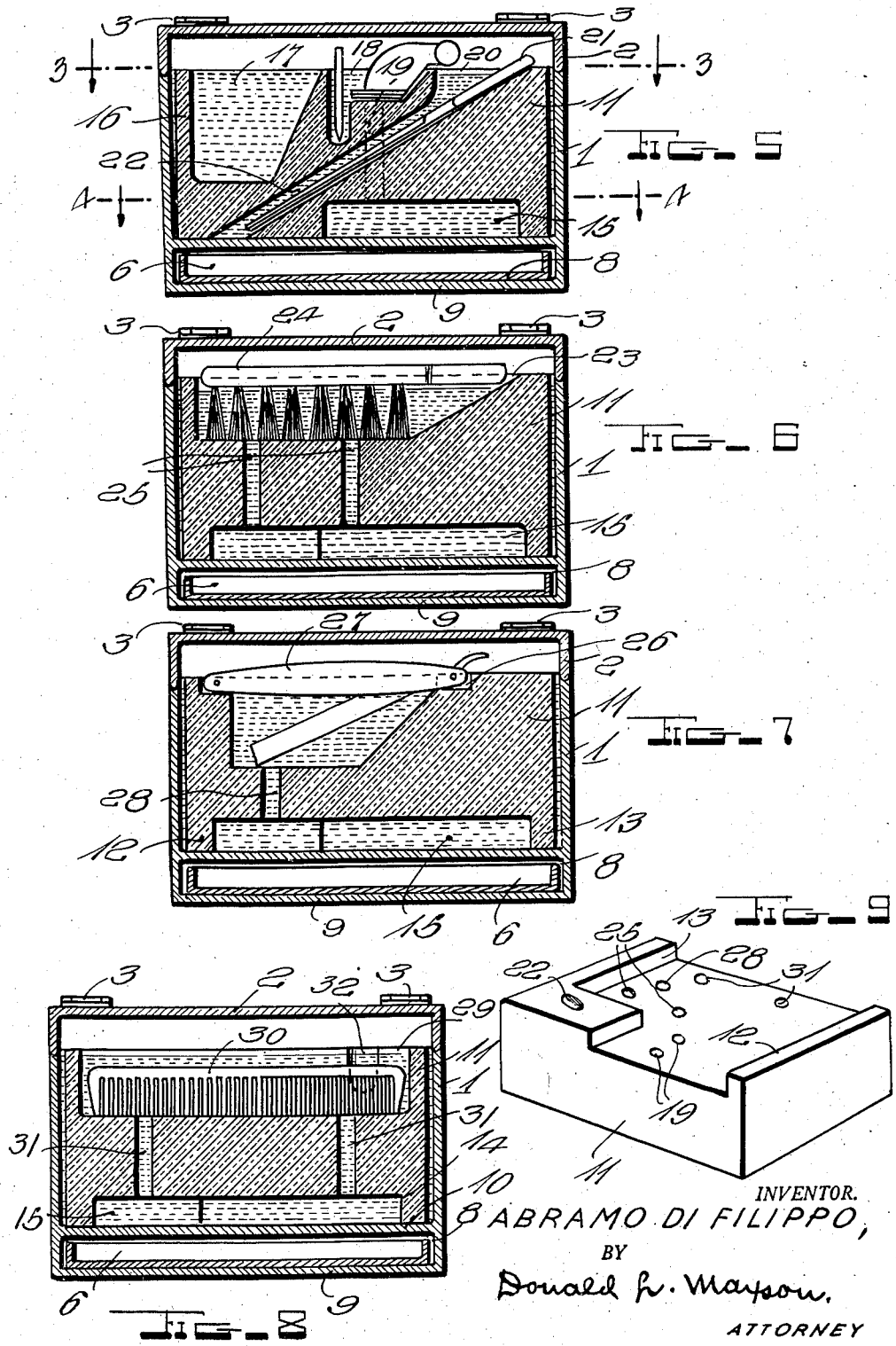

2,462,475

UNITED STATES PATENT OFFICE 2,462,475

STERILIZER FOR BARBERS' IMPLEMENTS

Abramo Di Filippo, Silver Spring, Md.

Application July 22, 1947, Serial No. 762,649

5 Claims. (Cl. 21—87)

This invention relates to improvements in sterilizers for barbers' implements.

An object of the invention is to provide an improved sterilizer in a single unit for razors, for shears, for combs, for clippers, for a hair brush, and for tweezers and any other barber's implements.

Another object of the invention is to provide an improved sterilizing receptacle for barber's implements comprising an outer waterproof casing and an inner receptacle having individually formed slots or wells for supporting razors, shears, combs, brushes, clippers, clipper heads, tweezers, and the various implements used by barbers, said outer receptacle being adapted to hold a disinfecting and sterilizing fluid, and each of said slots or wells having one or more openings extending downwardly to the bottom of the inner receptacle, except one slot or well which may hold an antiseptic fluid, said sterilizing fluid passing up into the various slots or wells to cover and sterilize the implements when placed and stored in the slots or wells shaped to receive them.

A further object of the invention is to provide an improved barber's sterilizer including an outer waterproof receptacle or casing having a top closure hinged thereto, and a drawer slidably received within a lower compartment in said receptacle, whereby the barber's implements not actually being used may be stored.

A still further object of the invention is to provide an improved barber's sterilizer formed with supporting seats or wells for receiving the various barber's implements, said seats having finger grooves formed in position to more readily grasp the implements when being removed from said seats or slotted wells.

A further object of the invention is to provide an improved barber's sterilizer which will be highly efficient in use and relatively inexpensive to manufacture and produce.

Other objects will appear as the description proceeds.

In the accompanying drawing,

Figure 1 is a front elevation of the improved barber's sterilizer;

Figure 2 is an end view of the improved barber's sterilizer;

Figure 3 is a partial sectional view taken on the line 3—3 of Figure 5;

Figure 4 is a sectional view taken on the line 4—4 of Figure 5;

Figure 5 is a sectional view taken on the line 5—5 of Figure 3;

Figure 6 is a sectional view taken on the line 6—6 of Figure 3;

Figure 7 is a sectional view taken on the line 7—7 of Figure 3;

Figure 8 is a sectional view taken on the line 8—8 of Figure 3, and

Figure 9 is a perspective view of the inner receptacle showing the bottom thereof.

Like characters of reference are used throughout the following specification and the accompanying drawings to designate corresponding parts.

In carrying out the invention, there is provided an outer casing formed of any desired waterproof material being generally designated by the reference numeral 1 having a hollow top closure or cover 2 hinged thereto at 3, and provided with a knob handle 4 and fastening or cover securing hooks 5. A drawer 6 having a knob handle 7 will be provided in a lower compartment 8 within the casing 1, said casing having a bottom 9 and a false bottom 10. The opposite ends of the casing and cover will be stepped or angled so as to permit the top or cover 2 to be opened to a vertical position when the casing 1 is placed adjacent to or in contact with a vertical wall.

An integral removable unit or receptacle 11 is preferably formed of glass, and is adapted to be positioned within the casing 1 in such a manner that it will be supported upon the false bottom 10 and will extend flush with the upper edge of the casing 1. Oppositely disposed depending integral flanges or supporting legs 12 and 13 will be formed along the lower opposite ends of the receptacle 11 to form a well 14 in the bottom of the said receptacle 11 and a sterilizing fluid 15 will be placed in the casing 1 to completely fill the same after the receptacle 11 is in position.

The inner receptacle 11 is formed with a plurality of slots or wells extending downwardly into its body for receiving the various barber's implements. A slot or well 16 will be formed in the left rear corner of the receptacle 11 for containing a quantity of antiseptic fluid 17, and will have no openings or ports extending from its bottom to the bottom of the receptacle 11, as do all of the other slots or wells later to be described.

To the right of the slot or well 16 is formed a slot or well 18 for receiving a portion of a clipper or any other implement used by a barber, said slot or well being provided with the downwardly extending ports or passages 19 connecting with the well 14 in the bottom of the receptacle 11, so that the sterilizing fluid 15 may pass upwardly to fill the slot or well 16 for sterilizing the implement when placed therein.

An inclined slot or well 20 will be provided in the upper right hand corner of the receptacle 11 for receiving scissors 21, and said slot or well will be provided with a port or passage 22 extending to the bottom of the receptacle 11 for permitting the sterilizing fluid 15 to enter and fill said slot or well 20 for sterilizing the scissors 21.

Disposed forwardly of the slots 16, 18 and 20, is a transversely extending slot or well 23 for the reception of a hair brush 24, and said slot or well 23 is also formed with a pair of downwardly extending ports or passages 25 through which the sterilizing fluid 15 may enter to fill the same to sterilize the brush 24.

Immediately in front of and spaced from the slot or well 23 is a transversely extending slot or well 26 for the reception of a straight razor 27, and said slot or well 26 will likewise be formed with a pair of depending ports or passages 28 through which the sterilizing fluid 15 may enter to fill said slot or well to sterilize the razor when placed therein.

A transversely extending slot or well 29 will be formed in the front edge of the top of the receptacle 11 for receiving a comb 30, and a pair of downwardly extending ports or passages 31 will extend from the slot or well 29 to the bottom of the receptacle 11 for permitting the sterilizing fluid to pass upwardly therethrough to fill said slot or well for sterilizing the comb when placed therein. Finger notches 32 will be formed at one or both ends of the slot or well 29 for readily removing the comb 30.

A slight space will be provided around the sides of the receptacle 11 between the same and the casing 1 to permit the sterilizing fluid 15 to completely surround the receptacle 11 and pass up through the bores to fill the slots or wells therein.

From the foregoing description it will be apparent that there has been devised and provided a highly efficient form of sterilizer for barber's implements which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A sterilizer for barber's implements comprising an outer casing adapted to hold a sterilizing fluid, a receptacle disposed within said casing formed with wells shaped to receive and support the various implements, and said wells having downwardly extending bores connecting the same with the bottom surface of said receptacle.

2. A sterilizer for barber's implements comprising an outer casing adapted to hold a sterilizing fluid, a receptacle disposed within said casing formed with wells in its upper surface shaped to receive and support the various implements, certain of said wells having finger notches formed at their opposite sides, and downwardly directed bores extending through said receptacle from said wells to the bottom thereof.

3. A sterilizer for barber's implements comprising an outer casing adapted to hold a sterilizing fluid, a cover closure hinged thereto, a handle on said cover closure, an integrally formed receptacle disposed within said casing formed with wells in its upper surface shaped to receive and support the various implements, certain of said wells having finger notches at their opposite sides, downwardly directed bores extending through said receptacle from said wells to the bottom thereof for permitting the sterilizing fluid to seek its level in each of said wells, and means for securing said cover closure in closed position.

4. A sterilizer for barber's implements comprising an outer casing adapted to hold a sterilizing fluid, a cover closure hinged thereto, a handle on said cover closure, a brace between said casing and cover closure for holding the same in raised position, an integrally formed receptacle disposed within said casing having means on its bottom formed for supporting the same in spaced relation to the bottom of said casing, said receptacle being formed with wells in its upper surface shaped to receive and support the various implements, finger notches formed in the opposite edges of certain of said wells, downwardly directed bores extending through said receptacle from said wells to the bottom thereof for permitting the sterilizing fluid to seek its level in each of said wells, and means for locking said cover closure in closed position.

5. A sterilizer for barber's implements comprising an outer casing adapted to hold a sterilizing fluid, a receptacle disposed within said casing formed with wells shaped to receive and support the various implements while being sterilized, certain of said wells having finger notches formed at their opposite edges, downwardly directed bores extending through said receptacle from said wells to the bottom thereof, and a drawer in the bottom of said casing for holding the implements after the same have been sterilized.

ABRAMO DI FILIPPO.

REFERENCES CITED

The following references are of record in the file of this patent:

UNITED STATES PATENTS

| Number | Name | Date |
| --- | --- | --- |
| 1,104,650 | Fries | July 21, 1914 |